United States Patent [19]
Dean

[11] Patent Number: 5,530,728
[45] Date of Patent: Jun. 25, 1996

[54] OPTICAL MEASURING SYSTEM

[75] Inventor: Ellis M. Dean, Cumbria, United Kingdom

[73] Assignee: British Nuclear Fuels plc, Cheshire, United Kingdom

[21] Appl. No.: 208,208

[22] Filed: Mar. 10, 1994

[30] Foreign Application Priority Data

Mar. 11, 1993 [GB] United Kingdom .................. 9304966

[51] Int. Cl.⁶ .................................................. G21C 17/00
[52] U.S. Cl. ........................ 376/248; 376/253; 376/259; 376/249; 376/260
[58] Field of Search ...................................... 376/248, 253, 376/259, 249, 260, 258; 356/11, 44, 401, 21, 4, 383; 976/DIG. 232; 33/701, 502, 707; 382/8

[56] References Cited

U.S. PATENT DOCUMENTS

| | | | |
|---|---|---|---|
| 3,832,485 | 8/1974 | Pieters | 178/6.8 |
| 3,835,245 | 9/1974 | Pieters | 178/6.8 |
| 4,410,278 | 10/1983 | Makihira et al. | 356/445 |
| 4,519,041 | 5/1985 | Fant et al. | 364/552 |
| 4,532,723 | 8/1985 | Kellie et al. | 356/73 |
| 4,605,531 | 8/1986 | Leseur et al. | 376/252 |
| 4,816,207 | 3/1989 | Scharpenberg | 376/252 |
| 4,881,247 | 11/1989 | Smith et al. | 376/257 |
| 5,204,911 | 4/1993 | Schwartz et al. | 382/8 |
| 5,311,206 | 5/1994 | Nelson | 345/89 |

FOREIGN PATENT DOCUMENTS

WO91/14180  9/1991  WIPO .

*Primary Examiner*—Donald P. Walsh
*Assistant Examiner*—Meena Chelliah
*Attorney, Agent, or Firm*—Nixon & Vanderhye

[57] ABSTRACT

The length of an object, particularly a spent fuel rod, is measured by taking an optical image of a support surface and then taking an optical image of a fuel rod when placed on the support surface. The two optical images are digitised, stored and then processed to obtain a difference in grey level values between the two stored images. The two images are stored as a plurality of columns each containing pixels having a grey level value. Using an algorithm, the difference between these values in corresponding columns of the two images are determined as root mean square values. The columns are processed in turn to determine which have a root mean square value above a threshold value, these being representative of the presence of a fuel rod. The number of such columns is a measure of the fuel rod length.

9 Claims, 4 Drawing Sheets

OPTICAL MEASURING SYSTEM

BACKGROUND OF THE INVENTION

1. Field of the Invention

This invention relates to the measurement of objects using an optical measuring system. More particularly, the invention relates to a method of measuring the lengths of spent nuclear fuel rods so that the mass of the rods can be determined.

2. Discussion of Prior Art

In the reprocessing of spent nuclear fuel it is important for inventory and accounting purposes that the amount of spent fuel to be reprocessed is calculated accurately. This requires a system for obtaining the mass of the spent fuel rods to be reprocessed.

In one particular application, measurement of the mass of the fuel rods takes place in a decanning cave in which a metal cladding is stripped from fuel elements to provide fuel rods for subsequent reprocessing. Because of the hostile environment existing within the cave, systems for direct weighing of the fuel rods have many disadvantages. For example, the components of such a system are subjected to adverse conditions of radiation, heat, mechanical shock and water existing within the cave. Thus, these systems tend to have a short operational life and require frequent servicing and maintenance. Because of the inaccessibility and the danger of radiation exposure associated with handling the weighing system components in the cave, direct weighing systems are unsatisfactory.

One known type of direct weighing system has a weighing device in which a weighing platform is supported on solid state load cells located in the decanning cave. Although such a system can produce accurate results, it has not proved satisfactory because the load cells are unable to withstand the mechanical shock loads and the high radiation fields existing within the cave and so tend to fail after a short period of time.

SUMMARY OF THE INVENTION

According to the present invention there is provided a method of measuring the linear dimension of an object, said method comprising the steps of obtaining a first optical image, said first optical image being of a support surface, digitising the first optical image and storing the first optical image in the form of grey level values, obtaining a second optical image, said second optical image being of an object to be measured when placed on said support surface, digitising the second optical image and storing the digitised second optical image in the form of grey level values, and processing the two stored digitised images to obtain a difference in grey level values between the first and second digitised images so as to determine the required linear dimension of said object.

To overcome the above-mentioned disadvantages of the prior art we have devised a non-intrusive measuring system as defined above which optically measures the lengths of the objects such as fuel rods. Having obtained the length of a fuel rod the system is able to calculate the mass of the fuel rod using a known value of mass per meter for the fuel material.

An advantage of the present invention is that it provides a non-intrusive, indirect weighing system for spent nuclear fuel rods and that none of the components of the system is located within the hostile environment of the decanning cave. As a result, the measuring system has a longer operational life than direct weighing systems and requires only a minimum amount of servicing and maintenance.

A further advantage of the present invention is that once the system is set up and calibrated it does not require any further input from an operator.

In a preferred embodiment the linear dimension is the length of a spent nuclear fuel rod.

Preferably the support surface forms part of a tray for receiving spent nuclear fuel rods.

The first and second digitised optical images are each stored as a plurality of columns, each column containing a plurality of pixels having a grey level value, the difference in grey level values of corresponding columns in the first and second optical images being determined as a root mean square value.

Preferably a root mean square value is selected as a threshold value, said threshold value being selected so that root mean square values above the threshold value are indicative of the presence of a fuel rod, and root mean squares values below the threshold value are indicative of the support surface.

In a preferred embodiment the two stored digitised images are processed using an algorithm which moves across the columns and processes each column in turn, the number of columns having a root means square value above said threshold value being a measure of the length of the fuel rod.

Preferably the algorithm is adapted to perform an averaging test on the first of said columns which indicates a root mean square value above the threshold value and on a plurality of columns next succeeding said first column, the result of said test indicating whether or not said root mean square value of said first column represents one end of the fuel rod.

The averaging test may be performed on the said first column and the next nine succeeding columns.

Preferably the algorithm is also adapted after establishing said one end of the fuel rod to perform an averaging test on a subsequent column indicating a root mean square value below said threshold value and on a plurality of next succeeding columns, the result of said test indicating whether or not said root mean square value of the said subsequent column represents the other end of the fuel rod.

The averaging test may be performed on the said subsequent column and the next nine succeeding columns.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS

Figure 1:
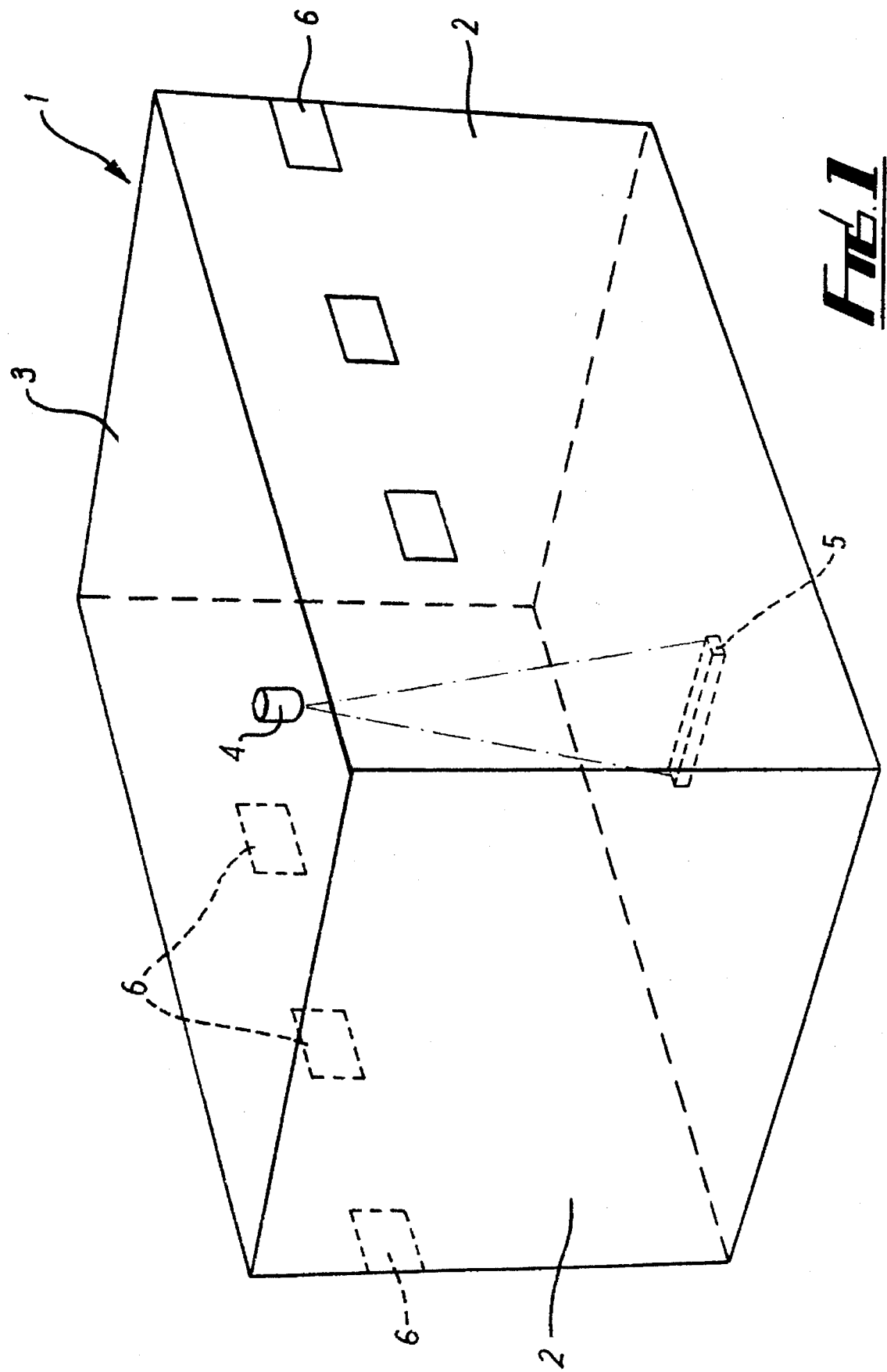
FIG. 1 shows a diagrammatic representation of a decanning cave.

Referring to FIG. 1, a fuel element decanning cave 1, shown in diagrammatic form, is provided with decanning equipment (not shown) for stripping the metal cladding from fuel elements to provide fuel rods for subsequent reprocessing. After stripping, the fuel rods are loaded into a magazine in which they are delivered to a spent fuel reprocessing plant. Because of the radioactive environment existing within the cave 1, the cave is constructed from four radiation shielding walls 2 and a radiation shielding roof 3.

Before the stripped fuel rods are despatched to the reprocessing plant it is necessary for accountancy and inventory purposes to obtain the mass of the fuel rods. This is determined by an optical measuring system which measures the lengths of the fuel rods and then calculates the mass of each fuel rod using a known parameter of mass per unit length. The system includes a closed circuit television camera 4 installed in the roof 3 of the decanning cave 1. Preferably the camera 4 is a monochrome, solid state camera which is designed to operate satisfactorily in low light conditions.

In use, spent fuel rods to be measured are placed on a support surface which forms part of a weigh tray 5 positioned within the field of view of the camera 4. Lighting for observation of operations within the cave 1 and for illuminating the fuel rods and weigh tray is derived from a number of high pressure sodium lamps 6 installed in the cave walls 2.

Figure 2:
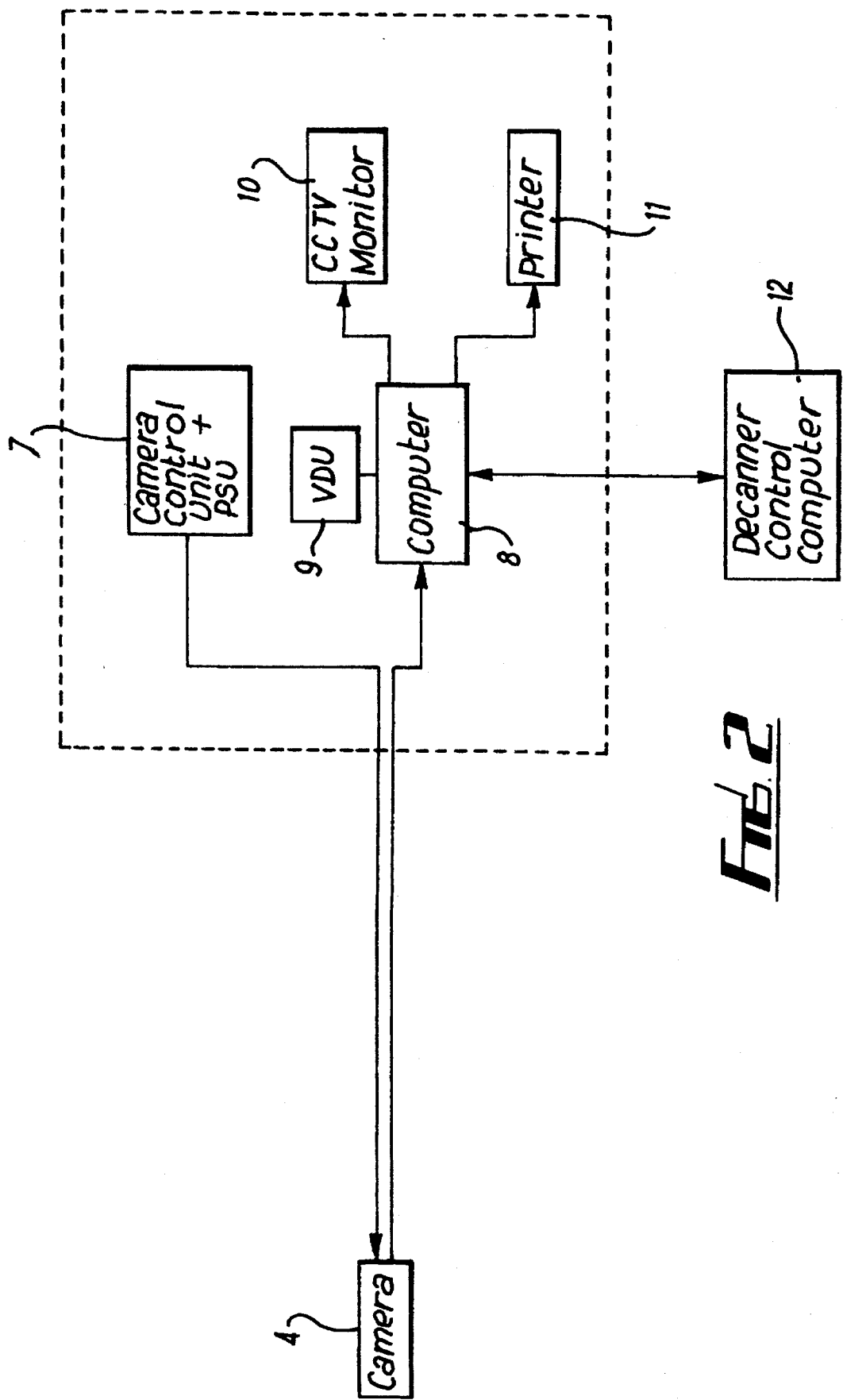
FIG. 2 shows a block diagram of an optical measuring system.

The position, field of view, contrast and focus of the camera 4 are regulated from a control unit 7 arranged at a location remote from the decanning cave, as seen in FIG. 2. The control unit 7 incorporates a power supply unit for the camera 4. Pictures from the camera 4 are stored in digitised forms by a monochrome video framestore card installed in a measuring system computer 8. A hard disk in the computer 8 is used to store information relating to results, faults and events and the pictures used to determine the fuel rod lengths.

The computer 8 has a video display unit 9 for displaying information relating to the current status of the measuring system, and instructions and menus for use during the setting up and calibration procedures. Pictures taken by the camera 4 are displayed on a monitor 10. A printer 11, connected to the computer 8, can be used for producing print-outs of measurement results.

The optical measuring system is under the overall control of a decanning control computer 12 which interfaces with the system through the measuring system computer 7. The decanning control computer 12 controls the operations of stripping the metal cladding from the fuel elements and the supply and delivery of fuel rods to and from the measuring system. The decanning control computer 12 interfaces with the measuring system to ensure that the fuel rods are measured at the correct time and to permit the calculated mass values to be reported to the control computer.

Before actual measurement of a fuel rod it is necessary to set up and calibrate the optical measuring system using a calibration rod of known length. The setting up procedure involves operation of the camera control unit 7 to position the camera 4 so that the weigh tray 5 lies within the camera's field of view. The desired area of interest is indicated on the monitor 10 by a rectangular region of the picture, typically extending across 720 pixels horizontally and 40 pixels vertically. By operation of the camera control unit 7 to adjust the focus and contrast of the camera 4 a clear picture of the weigh tray 5 is shown horizontally across the screen of the monitor 10.

When actually measuring the length of a fuel rod a measurement algorithm is used by the computer software to locate the ends of the fuel rod from images stored in the computer framestore card. This algorithm will give the length of the fuel rod in terms of the number of pixels, or columns, occupied by the fuel rod across the framestore card. In order to convert this value to an absolute fuel rod length it is necessary to calibrate the measuring system using a calibration rod of known length.

If the camera is not located directly above the weigh tray 5, the calibration factor relating the absolute rod length to the number of pixels its image occupies will not be constant along the whole length of the tray. In such an arrangement, the calibration procedure requires the determination of two calibration constants. The calibration procedure is carried out, after satisfactory alignment of the camera 4, by taking three pictures, one showing the support surface of an empty weigh tray 5, one of the calibration rod placed at a specified distance from one end of the weigh tray, and one of the calibration rod placed at a specified distance from the other end of the weigh tray. Each picture is stored in digitised form in the framestore card installed in the measuring system computer 8. For each of the two pictures of the calibration rod, the measurement algorithm is utilised by the computer software to determine the position of the ends of the rods in terms of the column number, or pixels, across the picture. The column numbers corresponding to the left and right ends of the calibration rod are displayed on the video display unit 9. The positions of the ends of the calibration rod when at either end of the weigh tray are then used, in conjunction with the known length of the calibration rod, to deduce the two calibration constants. These constants are stored on the computer hard disk as default values. On subsequent boot up of the computer the stored default calibration constants will be entered into the measurement algorithm.

To measure a stripped fuel rod prior to its despatch to the spent fuel reprocessing plant the measuring system operates as follows. The decanning control computer 12 sends a signal to the measuring system computer 8 indicating that the weigh tray 5 is empty. On receipt of this signal, the camera 4 is instructed to take a picture of the empty weigh tray 5, the picture being stored in digitised form in the computer framestore card. Using a so-called empty tray algorithm, the computer software compares the current picture with the picture of an empty weigh tray taken for a previous fuel rod. The root mean square (RMS) differences between the two pictures are then calculated for each column of 40 pixels. These RMS differences are compared to a threshold of an arbitrary value to determine whether the tray is sufficiently clean for the measuring procedure to continue.

When the measurement system determines that the support surface of the weigh tray is clear, the camera 4 takes a picture of the empty tray 5. The picture is digitised and stored by the measuring system computer framestore card. The fuel rod to be measured is then placed on the tray 1 and the decanning control computer 12 sends a signal to the measuring system computer 8 so as to initiate operation of the camera 4 to take a picture of the fuel rod. This picture is digitised and stored by the framestore card.

The software of the computer 8 then applies the measurement algorithm to the two stored digitised pictures to locate the ends of the fuel rod. These pictures are represented by an array of grey level values for each pixel in the area of interest. Each array contains 720 by 40 elements, each element, or pixel, having a grey level value between 0, signifying black, and 255, signifying white. The measurement algorithm calculates the differences between the two digitised pictures on a column by column basis. Thus, for each of the 720 columns of 40 pixels, the RMS differences in the grey level values of corresponding pixels in the two pictures are determined. If the difference between two corresponding pixels is positive, this indicates that the pixel in the picture of the fuel rod is brighter than the corresponding pixel in the picture of the tray surface. If the difference is negative, then the pixel in the fuel rod picture is darker than the corresponding pixel in the tray picture.

To avoid an overestimation of the fuel rod length caused by dark shadows at the ends of the rod, negative differences of less than a specified amount are discounted. For example, a difference of less than −10 was found to reduce the effect of the shadows whilst still allowing the algorithm to recognise slightly darker marks on the fuel rod.

Figure 3A:
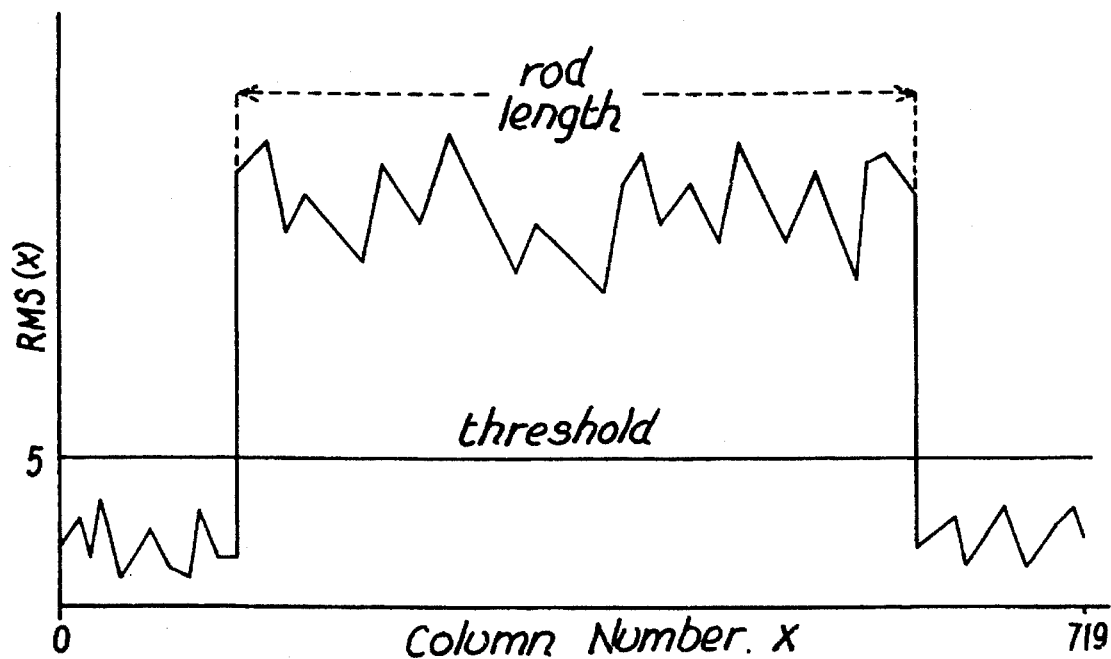
FIG. 3a is an idealised graph of root mean square differences between images of a fuel rod and a support surface.
Figure 3B:
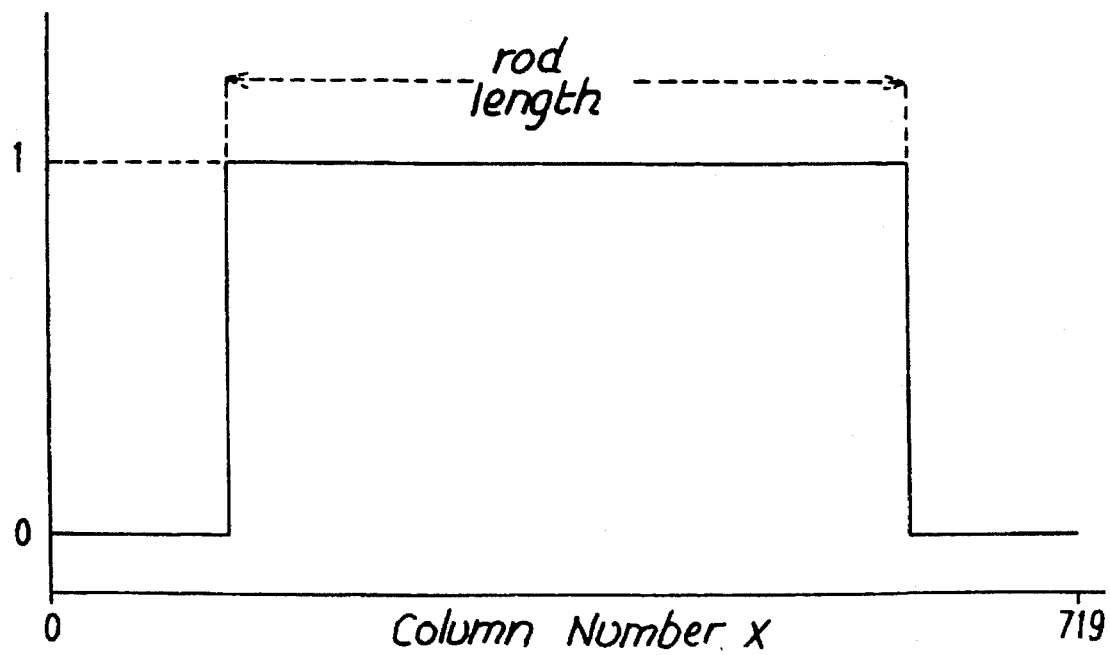
FIG. 3b is a binary image of the graph shown in FIG. 3a resulting from the application of a threshold value.

FIG. 3a shows an idealised graph of RMS(x) against column number x for RMS differences between fuel rod and weigh tray images. The ends of the fuel rod are indicated by a sharp rise and subsequent fall in the RMS(x) value. In use, the algorithm will set a threshold value above which the presence of a fuel rod is indicated. Typically, as seen in FIG. 3a, this value may be 5, but may be modified to suit the current lighting conditions in the decanning cave. Thus, any column with an RMS value above the threshold will be set to 1 and columns with an RMS value below this threshold will be set to 0, as indicated by the binary image of the idealised graph in FIG. 3b.

Figure 4A:
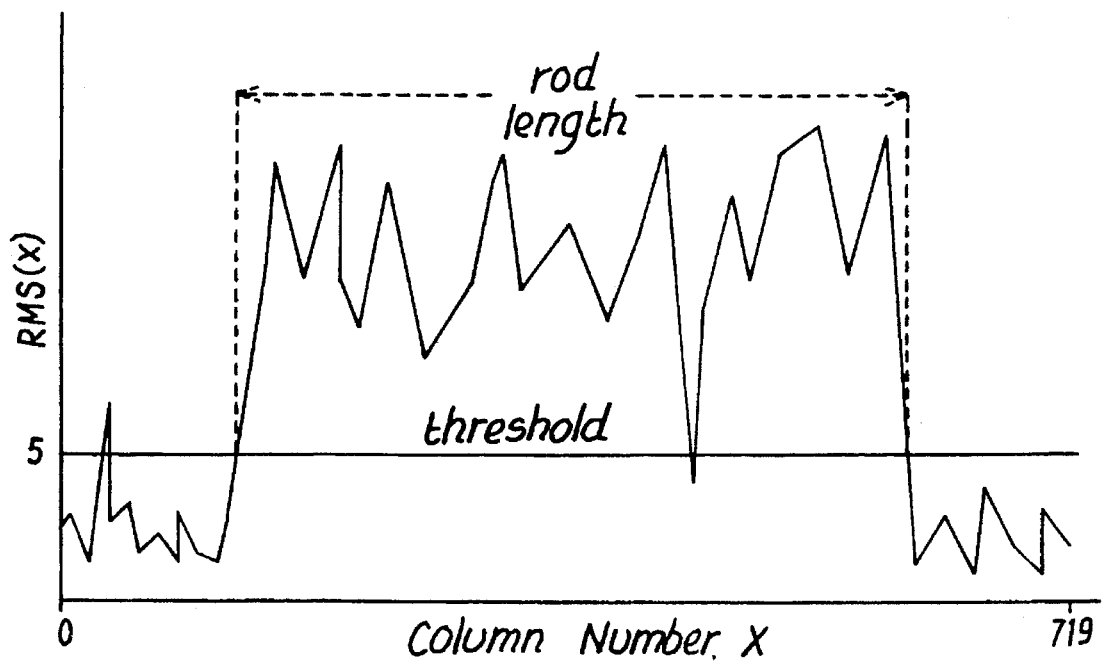
FIG. 4a is a typical graph of root mean square differences between images of a fuel rod and a support surface.
Figure 4B:
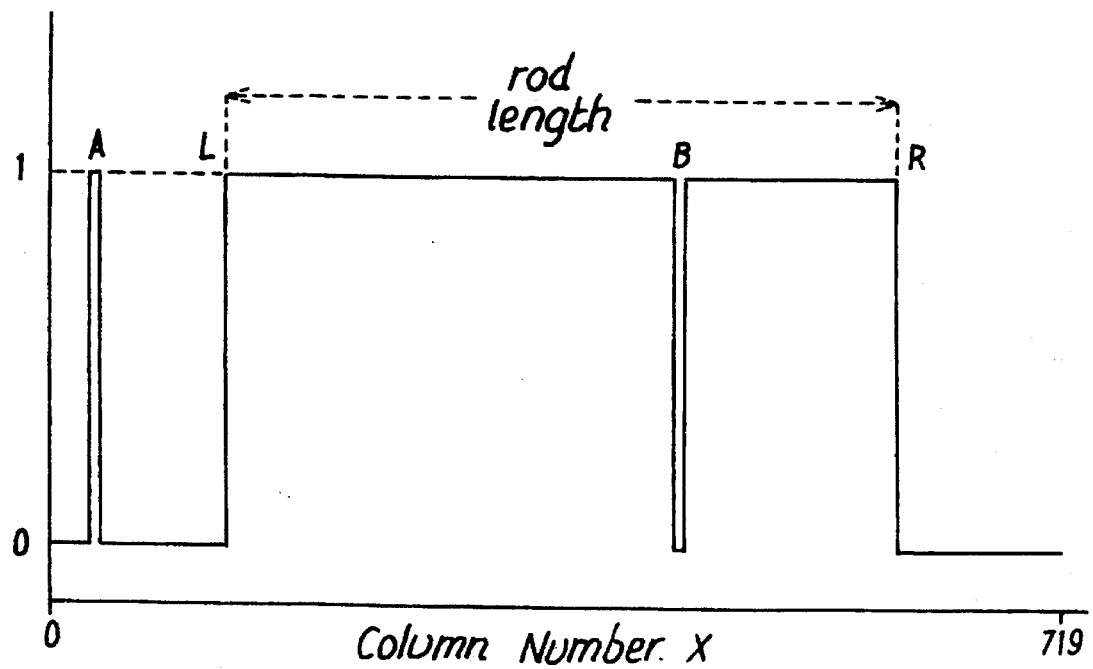
FIG. 4b is a binary image of the graph shown in FIG. 4a resulting from the application of a threshold value.

FIG. 4a shows a typical graph of RMS differences between the fuel rod and weigh tray pictures. FIG. 4b shows the corresponding binary image in which a threshold value of 5 has been applied. In use, the algorithm will search across the columns, moving sequentially from column 0 to column 719. The first column set to 1 may correspond either to the left hand end L of the fuel rod or to a spurious data point A caused by something else, for example water, on the tray. If the value 1 is due to one end of the fuel rod then the subsequent columns will also be set to 1. However, if the value 1 is due to a spurious cause, it is probable that a proportion of the subsequent columns will be set to a value of 0. In order to determine whether the value 1 represents the fuel rod end or a spurious point the algorithm performs an averaging test. This involves calculating the mean of the first column set to 1 and the nine succeeding columns. If the resulting mean is less than 1 this indicates that not all of the ten tested columns are set to 1 and it is assumed that the column at point A is due to a spurious cause. The search is continued and the algorithm will then locate the column corresponding to the left hand and L of the fuel rod.

The algorithm will continue the search across the columns to look for the next column set to 0. Again there is a possibility that the next column set to 0 is due to spurious data, as indicated at point B, caused, for example, by a mark on the fuel rod. The algorithm performs another averaging test by calculating the mean of the column set to 0 and the nine succeeding columns and from the result the column at point B will be discounted. The search continues and the algorithm will correctly locate the right hand end R of the fuel rod.

From the column numbers corresponding to L for the left hand end of the fuel rod and to R for the right hand end of the fuel rod the computer calculates the absolute length of the fuel rod using a calibration equation in which the calibration factors are incorporated. Thus, using the fuel rod length in meters derived by the algorithm and a known value of mass per meter, the computer will automatically calculate the mass of the fuel rod in kilograms. The calculated mass is transmitted to the decanning control computer and, if desired, the printer can produce a copy of the date, time and mass of the fuel rod.

I claim:

1. A method of measuring the linear dimension of a spent nuclear fuel rod, said method comprising the steps of obtaining a first optical image, said first optical image being of a support surface, digitizing the first optical image and storing the first optical image in the form of grey level values, obtaining a second optical image, said second optical image being of said spent nuclear fuel rod to be measured when placed on said support surface, digitizing the second optical image and storing then digitized second optical image in the form of grey level values, and processing the two stored digitized images to obtain a difference in grey level values between the first and second digitized images so as to determine the required linear dimension of the spent nuclear fuel rod, wherein the linear dimension to be measured is the length of said spent nuclear fuel rod.

2. A method according to claim 1, wherein the support surface forms part of a tray for receiving the spent nuclear fuel rod to be measured.

3. A method according to claim 2, comprising the steps of storing the first and second digitized images as a plurality of columns, each column containing a plurality of pixels having a grey level value, and determining the difference in grey level values of corresponding columns in the first and second optical images as a root mean square value.

4. A method according to claim 3, comprising the step of selecting a root mean square value as a threshold value, said threshold value being selected so that root mean square values above the threshold value are indicative of the presence of a fuel rod, and root mean square values below the threshold value are indicative of the support surface.

5. A method according to claim 4, wherein the two stored digitized images are processed using an algorithm which moves across the columns and processes each column in turn, the number of columns having a root mean square value above said threshold value being a measure of the length of the fuel rod.

6. A method according to claim 5, wherein the algorithm is adapted to perform an averaging test on the first of said columns which indicates a root mean square value above the threshold value and on a plurality of columns next succeeding said first column, the result of said test indicating whether or not said root mean square value of said first column represents one end of the fuel rod.

7. A method according to claim 6, wherein the algorithm is adapted to perform the averaging test on said first column and the next nine succeeding columns.

8. A method according to claim 6, wherein the algorithm is adapted after establishing said one end of the fuel rod to perform an averaging test on a subsequent column indicating a root mean square value below said threshold value and on a plurality of next succeeding columns, the result of said test indicating whether or not said root mean square value of the said subsequent column represents the other end of the fuel rod.

9. A method according to claim 8, wherein the algorithm is adapted to perform the averaging test on said subsequent column and the next nine succeeding columns.

* * * * *